(12) United States Patent
Schmitz et al.

(10) Patent No.: US 7,869,078 B2
(45) Date of Patent: Jan. 11, 2011

(54) REFERENCE MARKING SYSTEM AND TRACKING SYSTEM FOR LARGE AREA PRINTING

(75) Inventors: Gregory P. Schmitz, Los Gatos, CA (US); Michael C. Weisberg, Woodside, CA (US)

(73) Assignee: Xerox Corporation, Norwalk, CT (US)

( * ) Notice: Subject to any disclaimer, the term of this patent is extended or adjusted under 35 U.S.C. 154(b) by 1172 days.

(21) Appl. No.: 10/739,840

(22) Filed: Dec. 18, 2003

(65) Prior Publication Data

US 2005/0134928 A1    Jun. 23, 2005

(51) Int. Cl.
*G06K 15/00* (2006.01)
(52) U.S. Cl. .............. 358/1.18; 358/296; 358/473; 382/313; 382/314; 399/108
(58) Field of Classification Search .......... 358/473, 358/474, 501, 505; 382/313, 314
See application file for complete search history.

(56) References Cited

U.S. PATENT DOCUMENTS

| | | | | |
|---|---|---|---|---|
| 2,945,414 A | * | 7/1960 | Blackstone | 348/146 |
| 3,139,166 A | * | 6/1964 | Berlyn | 477/186 |
| 3,541,248 A | * | 11/1970 | Young | 358/473 |
| 3,735,350 A | * | 5/1973 | Lemelson | 235/472.03 |
| 4,464,973 A | * | 8/1984 | Rodler, Jr. | 89/40.03 |
| 4,652,937 A | * | 3/1987 | Shimura et al. | 379/100.02 |
| 4,706,128 A | * | 11/1987 | Tanioka et al. | 358/473 |
| 4,768,096 A | * | 8/1988 | Cannella et al. | 358/473 |
| 4,792,859 A | * | 12/1988 | Wicker et al. | 358/473 |
| 4,793,812 A | * | 12/1988 | Sussman et al. | 434/116 |
| 4,851,896 A | * | 7/1989 | Muranaga et al. | 358/443 |
| 4,851,921 A | * | 7/1989 | Sato et al. | 358/474 |
| 4,862,281 A |   | 8/1989 | Sato et al. | |
| 5,389,945 A |   | 2/1995 | Sheridon | |
| 5,825,044 A | * | 10/1998 | Allen et al. | 250/557 |
| 5,825,995 A |   | 10/1998 | Wiklof et al. | |
| 5,974,204 A | * | 10/1999 | Lin et al. | 382/314 |
| 5,995,713 A | * | 11/1999 | Lee | 358/1.5 |
| 6,081,629 A | * | 6/2000 | Browning | 382/313 |
| 6,208,427 B1 | * | 3/2001 | Lee | 358/1.15 |
| 6,277,456 B1 | * | 8/2001 | Bulgrin et al. | 428/40.1 |
| 6,367,993 B2 | * | 4/2002 | Day et al. | 400/88 |
| 6,394,674 B2 | * | 5/2002 | Huggins et al. | 400/88 |

(Continued)

OTHER PUBLICATIONS

John P. Carini, "Types of Forces-2", Feb. 26, 1999.*

(Continued)

*Primary Examiner*—King Y Poon
*Assistant Examiner*—Richard Zhu
(74) *Attorney, Agent, or Firm*—Fay Sharpe LLP

(57) ABSTRACT

A manual tracking apparatus including a manually moveable wand for reading and writing media is provided comprising a wand body partially enclosing at least one wheel, an axle, and a printing member. The printing member is supported by the wand body for printing on a media surface, the printing member having a maximum print area for a predetermined position of the wand body relative to a target object substantially less than the entire area of an image to be printed. A reference ruler is provided for aligning and indexing the position of the wand body relative to the target object. A wand tracking system can be provided including the at least one wheel rigidly coupled to the axle for guiding the wand in a straight line direction.

16 Claims, 9 Drawing Sheets

U.S. PATENT DOCUMENTS

| | | | |
|---|---|---|---|
| 6,543,893 B2 * | 4/2003 | Desormeaux | 347/109 |
| 6,607,260 B1 * | 8/2003 | Ikeda | 347/19 |
| 6,674,543 B2 * | 1/2004 | Day et al. | 358/1.8 |
| 6,991,332 B1 * | 1/2006 | Fan et al. | 347/109 |
| 7,133,168 B2 * | 11/2006 | Cheung et al. | 358/497 |
| 7,548,326 B2 * | 6/2009 | Fukushima | 358/1.12 |
| 2003/0137700 A1 * | 7/2003 | Kelsay | 358/300 |

OTHER PUBLICATIONS

Dark Star Imports, "Inline wheels FAQ", 2005.*

* cited by examiner

REFERENCE MARKING SYSTEM AND TRACKING SYSTEM FOR LARGE AREA PRINTING

BACKGROUND

The present exemplary embodiment relates to printers and/or scanners for direct printing and/or scanning on target objects, and an apparatus and method for aligning and indexing the tracking of the printer and/or scanner. The embodiment is particularly adapted to a printer and/or scanner having a maximum print or scan area for a predetermined position of a print body relative to a target object substantially less than the entire area of an image to be printed or scanned. It finds particular application in conjunction with a wand type printer/scanner, and will be described with particular reference thereto. However, it is to be appreciated the present exemplary embodiment is also amenable to other applications.

BRIEF DESCRIPTION

The present embodiments relate to a handheld wanding apparatus which can be manually passed over an original object, to read image information from the original object and write the image information into a memory, and which can be manually moved across a target object, and print image information on the target object based on the image information from the memory. The target object may take on many forms, for example, paper, whiteboard, glass, digitally addressable paper, etc.

Typically, printers require a supply of print media, such as paper or labels, to be loaded into the printer and controllably fed through the printer to a print head. An image is printed on the print media as it travels past the print head in a controlled fashion. A controllably moveable print medium is used to accurately control the position of an image being printed on the print medium. Printers of this type are effective and efficient when the image to be printed is less than or equal to the maximum print area of the printer.

Different solutions have been proposed for printing over large surfaces with a wand type printer. The predominant large surface application is using a wand type printer to print an image over a large, for example, whiteboard utilizing several adjacent swipes or tracks of the wand printer. One method for tracking the position of the wand while printing proposes to use two mouse track balls at each end of the wand to track and clock data out. The user starts in one corner of the whiteboard, swiping the wand over the board in straight line passes until the image is complete. A requirement is that the user must not allow the track balls to lose contact with the whiteboard until the entire image is printed, or image positioning will be lost. This method also incorporates the use of sophisticated tracking and positioning systems to print and stitch images together without using any reference points.

Another approach to overcoming some of the print requirements is to embed fiducials, glyphs, or encoder marks on the print media or complex tracking mechanisms, thereby permitting free form motion of the wand over the target object. From the fiducial data, skewed positioning of the wand can be corrected. Again, this represents a complex solution to print and stitch lines together in a coordinated fashion that results in a proportioned reproduction of the image or text.

A freehanded printing mechanism (wand) designed for printing on, for example, digitally addressable paper (electric paper), is defined to be a printing mechanism that can be traversed over the print media by hand and is not mechanically coupled to any type of tracking system. As described above, one approach to "print" on the digitally addressable paper is to embed fiducials in the "paper" and then optically track the fiducials with the wand printer.

Some of the aforementioned approaches are presented in U.S. Pat. No. 4,851,896 to Muranga, et al., U.S. Pat. No. 4,862,281 to Sato, et al., and U.S. Pat. No. 5,825,995 to Wiklof, et al., and are incorporated herein by reference.

SUMMARY

A handheld or wand printer for printing and/or scanning over surfaces larger than the width of the printer head incorporates simplified requirements for sensing the position of a wand printer/scanner while printing/scanning. It is to be appreciated, that while the description and claims are directed at the printing process of an image, a reverse or associated process can be used for scanning images over large surfaces.

In accordance with one aspect of the present exemplary embodiment, a manual tracking apparatus is provided including a manually moveable wand for reading and writing bits of media comprising a wand body partially enclosing at least one wheel, an axle, and a printing member. The printing member is supported by the wand body for printing on a media surface. The printing member has a maximum print area for a predetermined position of the wand body relative to a target object substantially less than the entire area of an image to be printed. A reference ruler is provided for aligning and indexing the position of the wand body relative to the target object.

In accordance with yet another aspect of the present exemplary embodiment, a manual tracking apparatus is provided including a manually moveable wand for reading and writing bits of media, comprising a wand tracking system including at least one wheel rigidly coupled to an axle for guiding the wand in a straight line direction. A wand body is provided which partially encloses the at least one wheel and the axle. The printing member is supported by the wand body for printing on a media surface. The printing member has a maximum print area for a predetermined position of the wand body relative to a target object substantially less than the entire area of an image to be printed.

In accordance with yet another aspect of the present exemplary embodiment, a manual tracking apparatus is provided including a manually moveable wand for reading and writing bits of media comprising a wand body partially enclosing at least one wheel, an axle, and a printing member. The printing member is supported by the wand body for printing on a media surface, the printing member having a maximum print area for a predetermined position of the wand body relative to a target object substantially less than the entire area of an image to be printed. A reference ruler is provided for aligning and indexing the position of the wand body relative to the target object. A wand tracking system is provided including the at least one wheel rigidly coupled to the axle for guiding the wand in a straight line direction.

In accordance with a still further aspect of the present exemplary embodiment, a method of printing an image on a target object using a wand printer having a moveable wand body supporting a printing member is provided comprising the following steps: positioning the wand body to place the printing member in a pre-print start position; moving the housing to move the printing member from the pre-print start position to a pre-print finish position whereby a reference ruler is printed on the target object; positioning the housing to place the printing member in a first printing position aligned with the reference ruler and moving the housing to move the printing member from the first printing position to a plurality of successive printing positions each aligning along the reference ruler, detecting the location of each successive one of the plurality of successive printing positions relative to the first printing position, wherein the step of detecting the location comprises counting the plurality of successive printing positions; determining what portion of the image is to be printed at the first printing position and at successive printing positions at each of the detected locations based on the scaling factor and the detected location, and activating the printing member in response to the determined portion of the image to be printed on the target object at the first printing position and each of the detected locations so as to successively print all portions of the image on the target object.

BRIEF DESCRIPTION OF THE DRAWINGS

The invention may take physical form in certain parts and arrangements of parts, several preferred embodiments of which are described in the specification and illustrated in the accompanying drawings which form a part hereof and wherein.

DETAILED DESCRIPTION

Figure 1:
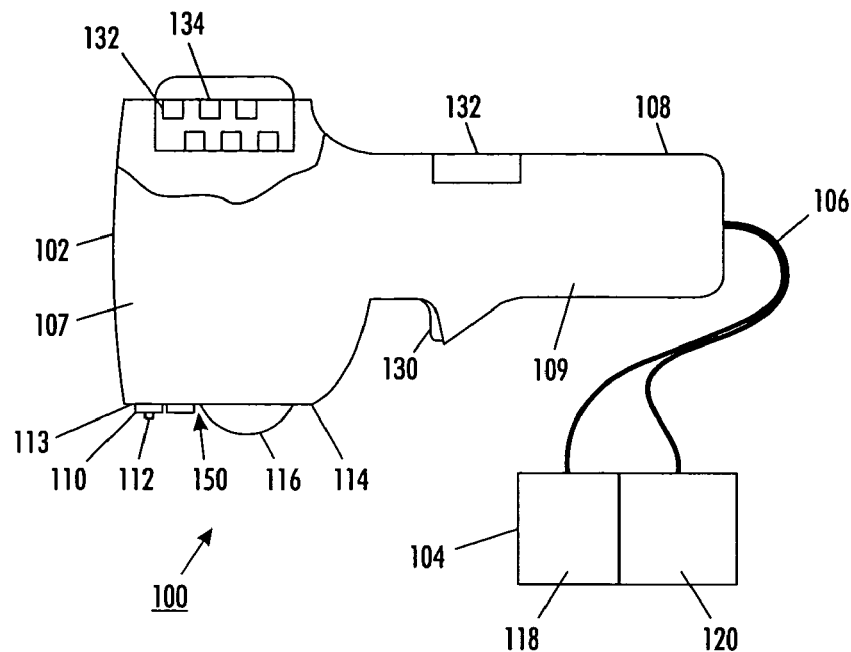
FIG. 1 is a side elevational view of an embodiment of a printer according to the prior art.

With reference to FIGS. 1-4, a handheld mobile printer 100 according to the prior art is shown. The mobile printer 100 has a handheld portion 102 and a separate controller module 104 connected by a connector cable 106. The handheld portion 102 has a housing 108 with a head portion 107 having a printing face 114 and a handle 109 which is ergonomically designed for ease of grasping and control by the hand of a user. A trigger button 130 is positioned on the handle 109 for actuation by the user. While the handle 109 of the illustrated embodiment is adapted for holding by a human hand, the printer 100 can be designed for attachment to a moveable mechanical arm.

A rotatable cylindrical roller 116 and thermal printhead 110 are mounted in the head portion 107 of the housing 108 at the printing face 114. The roller 116 is rotatably mounted with a portion of the roller 116 protruding from a roller aperture 150 in the printing face 114. The thermal printhead 110 is mounted with a row of thermal printing elements 112 exposable at the printing face 114 through an opening 113 in the printing face 114. The thermal printhead 110 is a conventional edge-type thermal printhead.

In operation, a user grasps the handheld portion 102 by the handle 109 and passes the head portion 107 over a target object with the roller 116 in rolling contact engaging the surface of the target object and the trigger button 130 depressed to activate the printhead 110 for printing. When the head portion 107 is passed over the target object with the roller 116 in rolling contact with the target object, the printing face 114 is facing toward the target object and the thermal printhead 110 comes into thermal contact with the target object. When the user depresses the trigger button 130, printing is enabled and the thermal printhead 110 is energized as it passes successive printing locations. This causes heating of the printhead 110 and corresponding heating of the printing location on the target object in a predetermined heating pattern. The heating of the printing location activates a thermally sensitive ink on the target object and produces a desired printed image.

The controller module 104 contains a printer controller 118 and a power source 120. In the preferred embodiment, the power source 120 is a battery pack. However, the power source 120 may alternately use line power.

Figure 2:
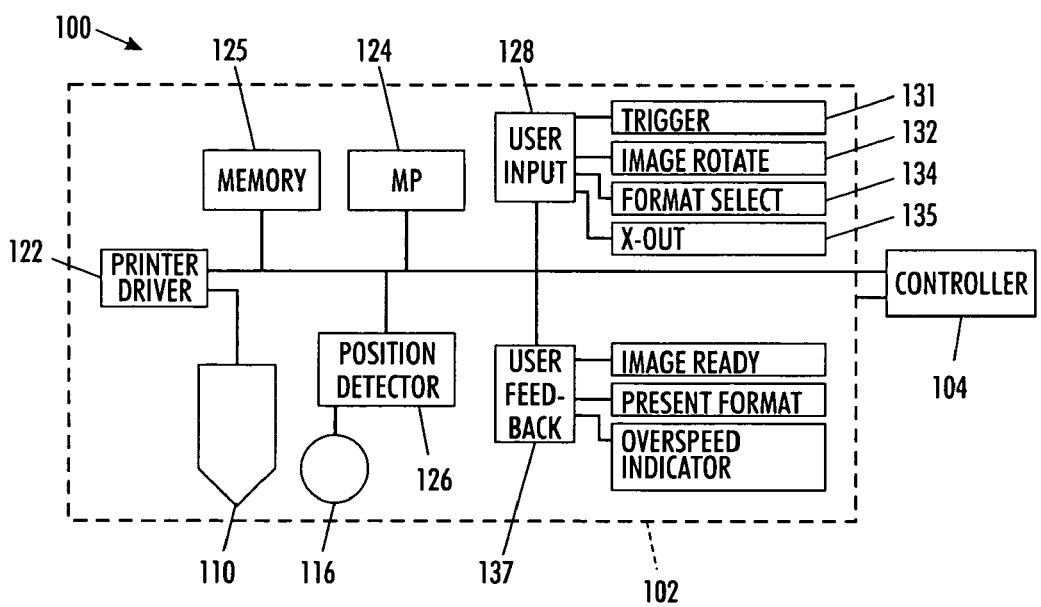
FIG. 2 is a diagrammatic view of the printer of FIG. 1.
Figure 3:
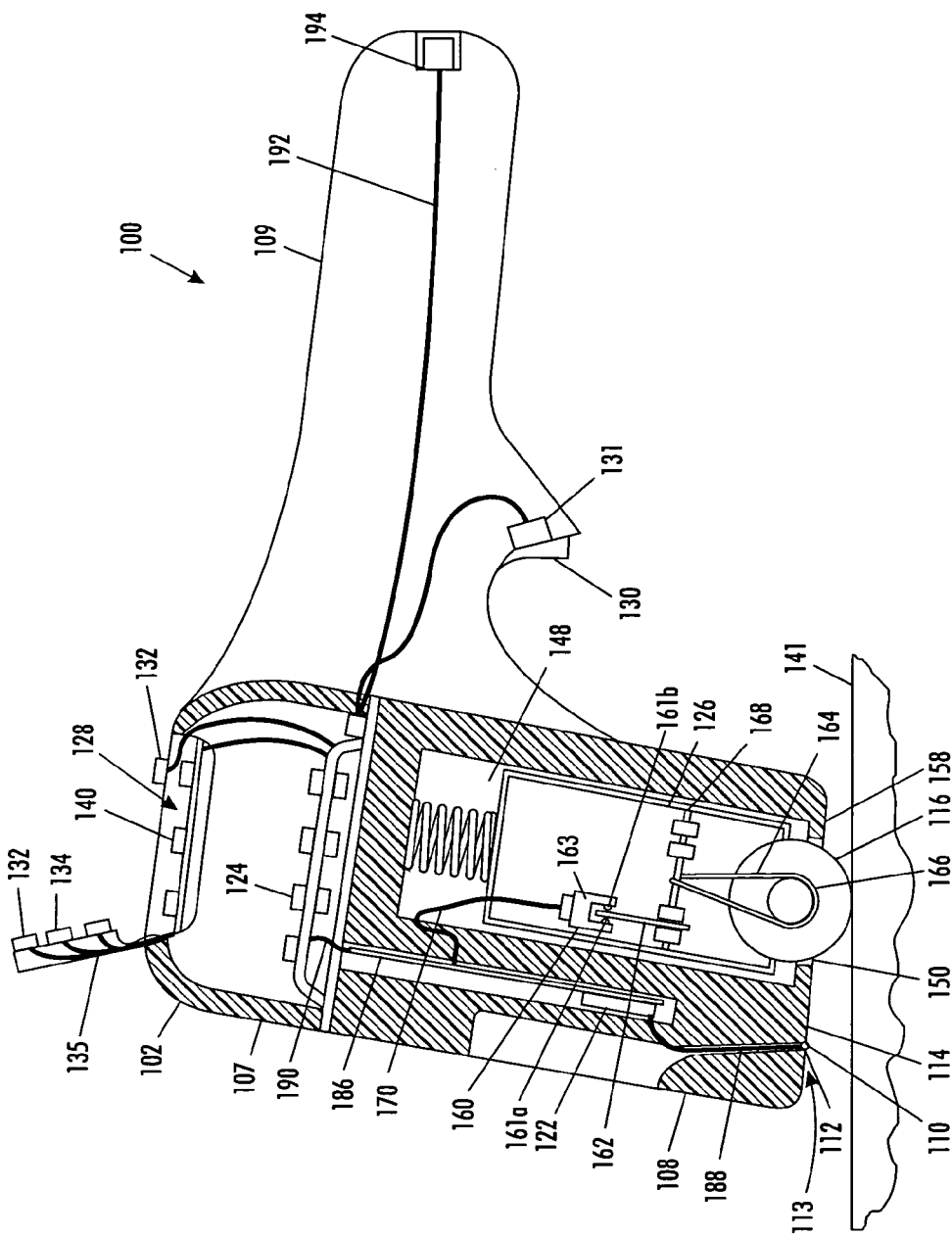
FIG. 3 is an enlarged, cross-sectional side elevational view of the printer of FIG. 1 with a feedback module rotated to an open position.

A schematic representation of the printer 100 of FIG. 1 is shown in FIG. 2 with the components carried within the handheld portion 102 being outlined by a broken line. In the handheld portion 102, the printhead 110 is energized using a conventional printer driver 122 controller by a microprocessor 124. In the thermal printhead 110 of the preferred embodiment, the printer driver 122 contains current drivers driven by a signal supplied by the microprocessor 124 in combination with a system clock and additional logic components in accordance with conventional design.

The microprocessor 124 receives information concerning the position and/or velocity of the handheld portion 102 from a position detector module 126 which is operatively connected to the roller 116. The position detector module 126 includes a rotational detector 160 (as will be described in connection with FIG. 3) which converts the rotational movement of the roller 116 into a digital electrical signal for input to the microprocessor 124.

The microprocessor 124 also receives data from a printer memory 125 and may also receive input from a user through a user input interface 128 (best seen in FIG. 3) such as a keyboard or similar unit. The user input interface 128 transfers signals from a user operable image rotation four-position switch 132, a trigger switch 131 engaged by the trigger button 130, an "X-out" switch 135 and a user operable format select switch 134 to the microprocessor 124.

Referring again to FIG. 3, as the printer wand is pressed into contact with the target object 141, the roller wheels rollingly engage the target object. As the printer wand is moved relative to the target object, the roller wheels rotate accordingly. Rotation of the roller wheels is converted into an electrical signal in a manner known in the art. In one embodiment, this is achieved by a rotational detector 160 which detects the rotation of an encoder wheel 162 mounted on an encoder shaft 168 and an optical detector 163. Rotation of the roller wheels are transmitted to the encoder shaft 168 through a belt 164 to produce corresponding rotation of the encoder wheel 162. The belt 164 is positioned on a pulley 166 attached to the roller for rotation therewith. Other methods of translating the rotation of the roller wheels into the rotation of the encoder wheel 162, such as gears, will be readily apparent to those skilled in the art.

The encoder wheel 162 has a series of alternately transmissive and opaque radial areas evenly spaced circumferentially around the wheel. The optical detector 163 includes an optical source 161a and pair of optical receivers 161b with the encoder wheel 162 positioned between the optical source and receiver pair such that as the roller 116 moves an incremental distance, successive transmissive and opaque areas of the encoder wheel pass between the optical source and receiver pair. The optical detector 163 outputs a signal corresponding to the angular rotation of the encoder wheel 162 which corresponds, in turn, to the distance traveled by the roller 116 with transitions in the signal corresponding to fixed increments of motion. The rotational detector 160 thus produces an electrical signal indicative of the rotation and/or rotational velocity of the roller 116 for input to the microprocessor 124 via a position signal line 170. Such rotational detectors are commercially available devices which produce signals appropriate for input to the microprocessor 124. Other devices and methods for producing an electrical signal indicative of position and/or velocity of the roller 116 will be readily apparent to those skilled in the art.

The print head 110 is energized by the printer driver 122 controlled by the microprocessor 124. The printer driver provides electrical current to individual print elements to heat the print elements for a selected time during which the print head is aligned with successive printing locations to print successive print lines. The printer driver 122 is mounted on an extended platform 186 within the head portion 107 of the housing 108 adjacent to the position detector module 126 to permit it to be positioned close to the print head 110. The printer driver is connected to the print head 110 by a print head bus 188 and is connected to the microprocessor 124 and related circuitry by an extended platform bus 190.

Printing data, instructions, and other signals from the printer controller 118 and power from the power source 120 of the controller module 104 are supplied within the hand held portion 102 by a cable 192 which extends through the handle 109 and terminates in a handle input connector 194. The connector cable 106 shown in FIG. 1 is removably attached to the handle connector 194.

Figure 4:
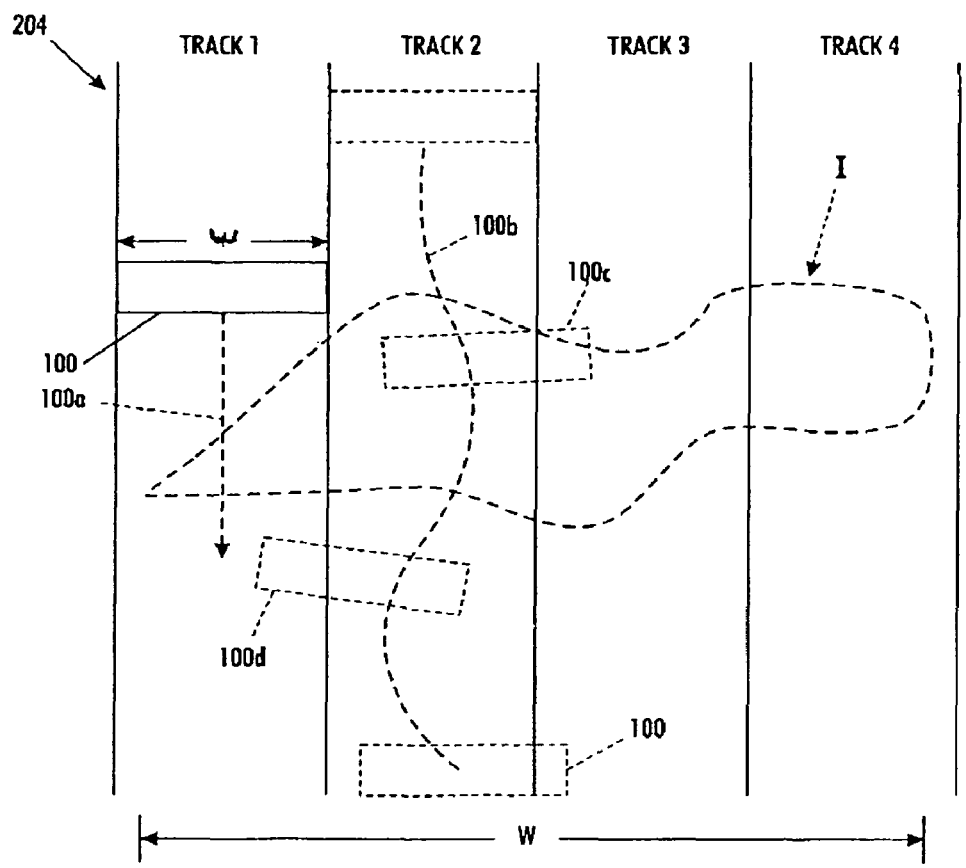
FIG. 4 illustrates a swiping process using a prior art mobile printer.

FIG. 4 depicts a target object 204 on which mobile printer 100, shown here in a block type diagram, is used to print an image consisting of text and/or graphics. The intended process is for mobile printer 100 to be swiped downward from the first track (track 1) in accordance with a straight line path designated by line 100a. It is to be understood that in this embodiment, there are four tracks (track 1, track 2, track 3, and track 4). However, these tracks are not physical objects, but rather are provided for this description to understand that mobile printer 100 is intended to be traversed down the target object 204 in a straight path, where it is printing as it is being swept in the downward direction. It is to be appreciated that a width w of the printer 100 includes a print area which is substantially less than a width W of an entire print image I an area. As such, the entire print area of the image I is printed on the target object 204 in a series of tracks. In the example shown in FIG. 4, the area of the print image I necessitates the printing of four tracks. Once the printing in track 1 is completed, the process is repeated for the remaining tracks (i.e. track 2-track 4). However, such a system relies heavily on the ability of the user to swipe mobile printer 100 in a straight path not deviating from the alignment required by the tracks. As can be imagined, this is a free-form type of printing and, therefore, instability in the user's swiping action may result in a swiping path which is shown by swiping line 100b. As can be seen, the swiping line 100b takes mobile printer 100 into track 3, 100c, as well as over into previously printed track 1, 100d. While this printing line 100 may be exaggerated, even small variations off the required track positions will result in overlap or double-printing of areas, resulting in an undesirable overall image generated on a surface 205 of the target object 204.

Concepts of the present application therefore are directed to improving the stability of a printing device as it is swept across a track of a target object, where the stability is intended to mean the maintaining of a straight sweep line.

Figure 5:
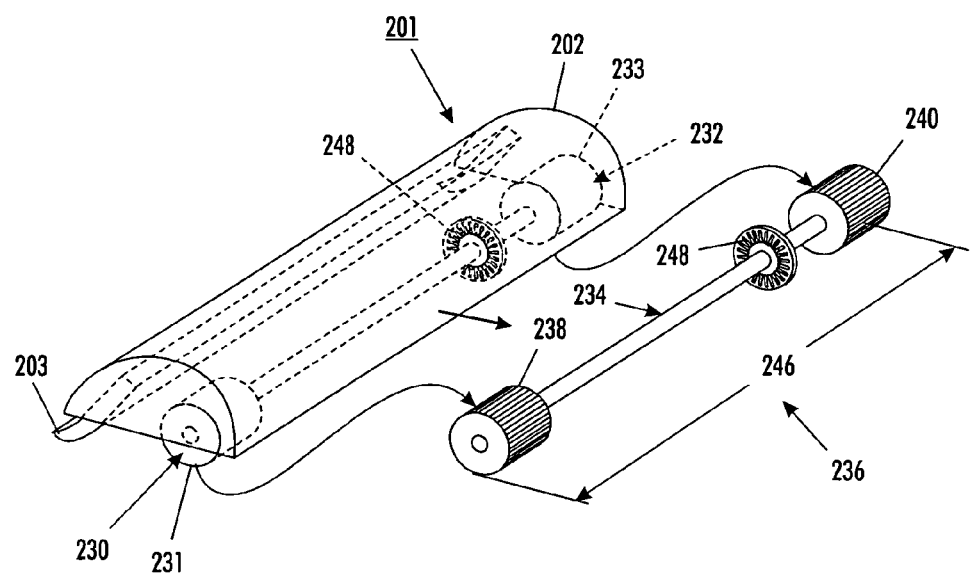
FIG. 5 is an exploded view of the portion of the printer.

Referring again to FIG. 5, a simplified word printer or wand 201, showing a partially cut away wand body 202, reveals the position of a pair of cylindrical rollers or wheels 230, 232. The wheels 230, 232 are adapted to frictionally engage the surface 205 of the target object 204 on which it is desired to print an image. The wand 201 is constrained to a straight path through the use of the two cylindrical wheels 230, 232 rigidly connected to a transverse axle 234. Constraining the wand 201 to a straight path can eliminate the requirement of either embedded fiducials on the print media or complex tracking mechanisms which permit freeform motion of the wand 201 over the surface. The wheels 230, 232 have a substantial length therebetween and include frictional outer surfaces 238, 240, as will be described below, which act to constrain the wand 201 to roll in a straight line path (track) thereby resisting rotational or lateral slippage (scrub), permitting the printing position to be determined accurately and simply. The wheels 230, 232 each include an outer edge 231, 233. The outer edges 231, 233 define a distance 246 therebetween. It is to be appreciated that the distance 246 between the two outer edges 231, 233 can be less than the width w of the print area. As the printer wand 201 is moved along a track, the wheels 230, 232 do not overlap or contact the previous track's print image area. This ensures that each track image is undisturbed by the successive adjacent track image.

It is to be appreciated the above concepts are not limited to two wheels or wheels of a particular width. It is conceivable that the two wheels could be one long wheel (not shown) including a length less than the width w of the print area. The tracking system or assembly 236, as shown, generally includes the two roller wheels which can be made of, for example, rubber or hard plastic, and can be rigidly coupled by the axle 234. The outer surfaces 238 240, for example, can include a coating and/or ridges therearound. Additionally, an encoder 248 can be attached to the axle 234 which will reposition and allow data to be clocked out at a resolution relative to the desired pixel density. The assembly 236 can be housed in the wand body 202 just aft of a print head 203. Straight line tracking can be easily maintained over many feet while the encoder 248 clocks out bits of media. The straight line tracking generally relies on the rigid coupling between the two wheels 230, 232 and the coefficient of friction of the wheels 230, 232. Friction is a resistive force that prevents two objects from sliding freely against each other. The coefficient of friction μ is a number that is the ratio of the resistive force of friction divided by the normal or perpendicular force pushing the objects together. Static friction is the force that holds back a stationary object up to the point that it just starts moving. Thus, the static coefficient of friction μ(s) concerns the force restricting the movement of an object that is stationary on a relatively smooth, hard surface. Once static friction is overcome, kinetic friction is the force holding back regular motion. The kinetic coefficient of friction μ(k) concerns the force restricting the movement of an object that is sliding on a relatively smooth, hard surface.

Figure 6:
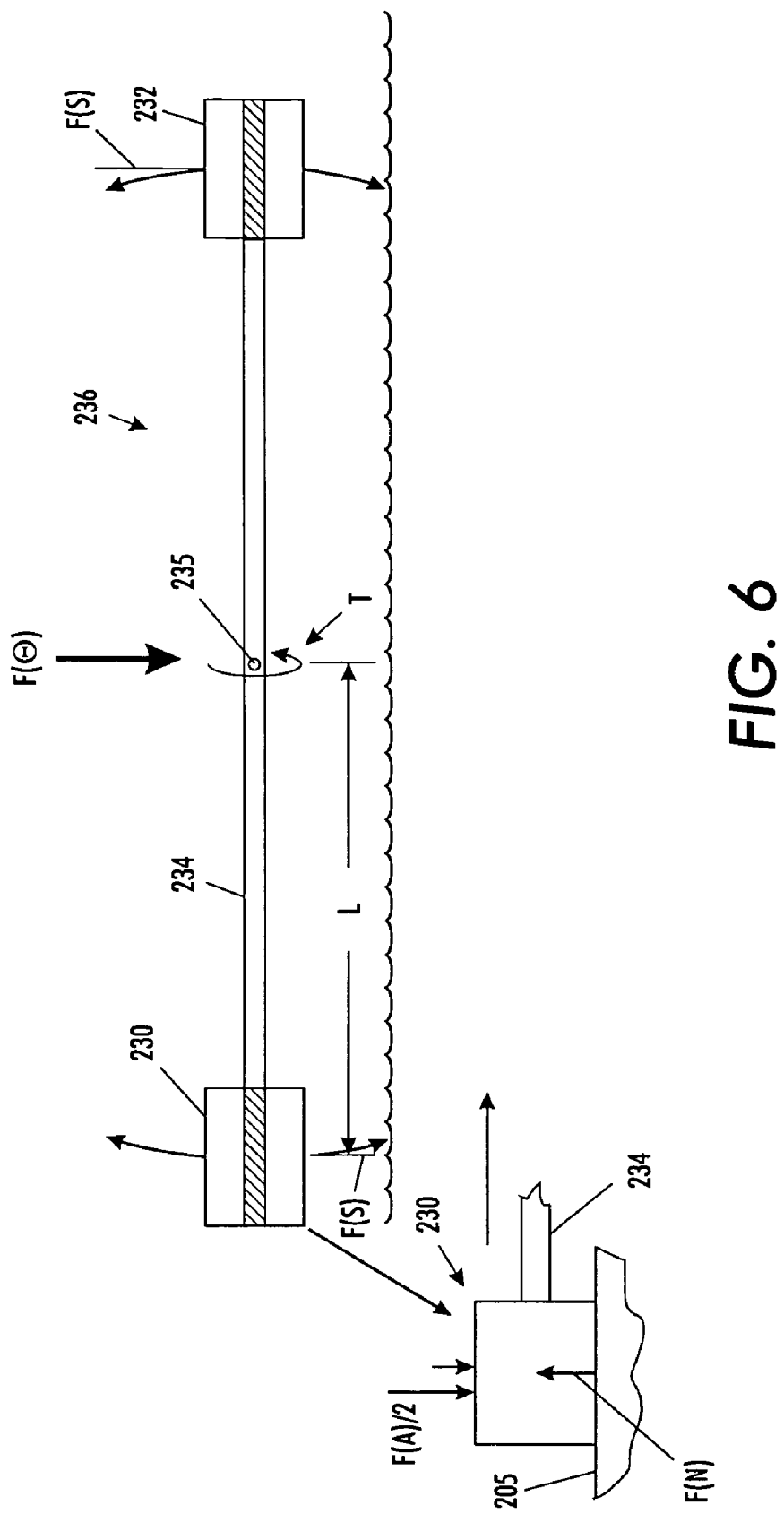
FIG. 6 is a diagrammatic view of the forces acting upon the printer wheels and axle of the printer.

Referring now to FIG. 6, a force analysis diagram is displayed. The wheels 230, 232 are shown as cylindrical wheels having a consistent diameter. As shown, the reaction normal force F(n) on each wheel is equal to one-half the applied downward force F(a). The static resisting force of the wheel, F(s), is less than or equal to the static coefficient of friction μ(s) times the reaction normal force F(n). The kinetic resisting force F(k) of the wheel is equal to the kinetic coefficient of friction μ(k) times the reaction normal force F(n). As shown, the axle and wheel assembly 236 can have a torque moment T imparted from the wrist of the user (yaw). Assuming that the torque moment T is applied at the center 235 of the axle 234, in order to maintain a straight line movement of the wand body 202, the resisting force of the wheels 230, 232 to yaw is engineered such that it is greater than the yaw torque moment T applied by the user. With a high static coefficient of friction μ(s) approaching one, the sum of the static resistance forces from the wheels 230, 232 is approximately equal to the applied force F(a) of the user. Straight line tracking of the wand 201 can be maintained when the product of the static coefficient of friction μ(s), the applied downward force F(a), and the length of the moment arm L is greater than the torque moment T from the wrist of the user. The resisting forces from the wheels 230, 232 do not need to be as large as the applied downward force F(a) of the user, since the wrist joint has universal articulation and very little resistance. In one design, the roller wheels can be made of a material having a durometer in a range of 60 A to 90 A, and preferably, can be a polyurethane rubber with a durometer of 80 A, a static coefficient of friction μ(s) in a range of 0.6-0.99 for some material, and preferably 0.9 for polyurethane rubber, and a kinetic coefficient of friction μ(k) in a range of 0.6-0.99 for some material, and preferably 0.8 for polyurethane rubber. The aforementioned coefficients are representative of, for example, rubber wheels on a dry surface. In an alternative design, the roller wheels can include a coating and/or ridges thereon exhibiting the above-referenced properties.

Figure 7:
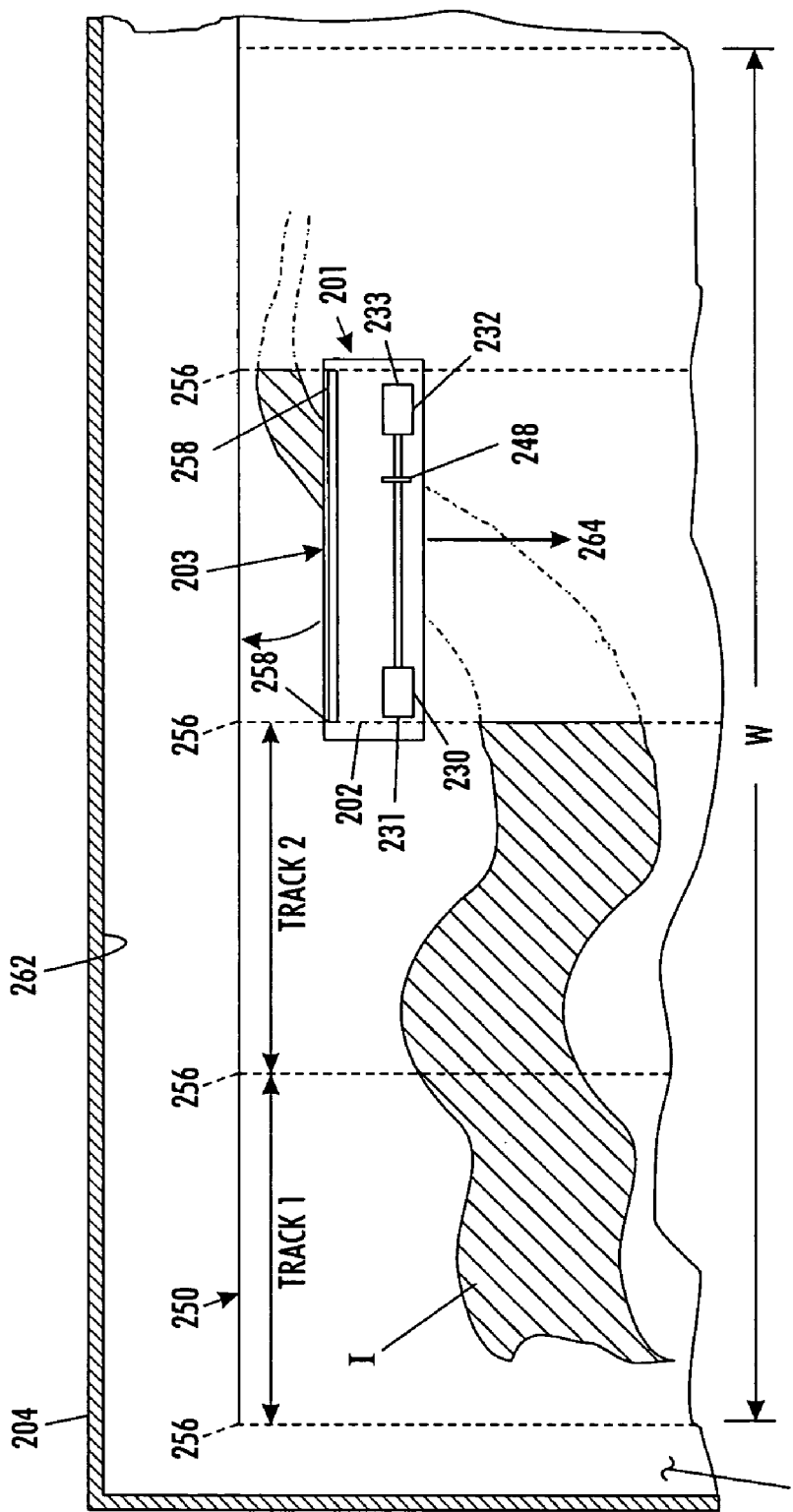
FIG. 7 is a diagrammatic top view of a portion of the printer in a print orientation according to the present exemplary embodiment.
Figure 8:
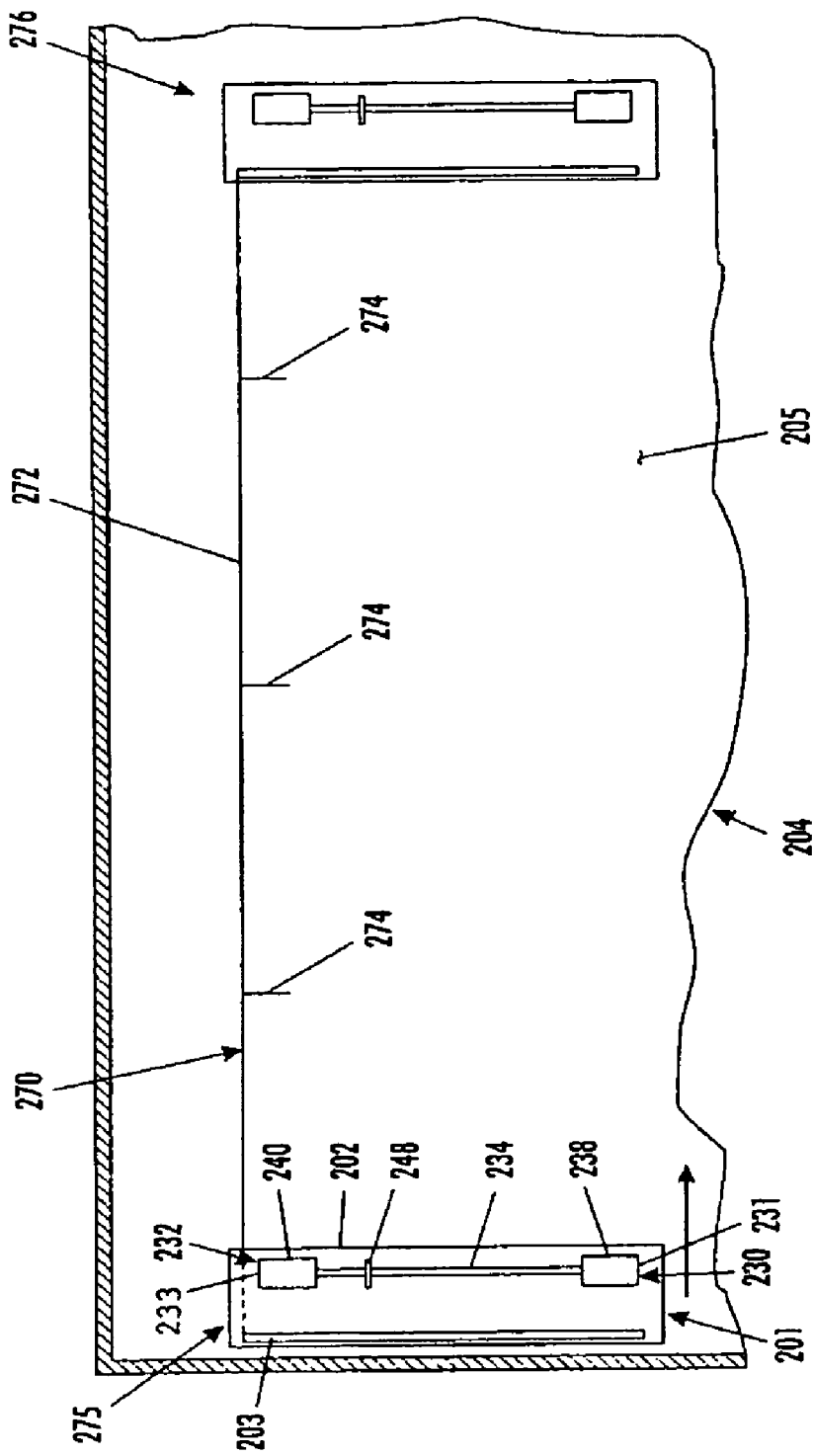
FIG. 8 is a diagrammatic top view of a portion of the printer in a pre-print orientation according to the present exemplary embodiment.
Figure 9:
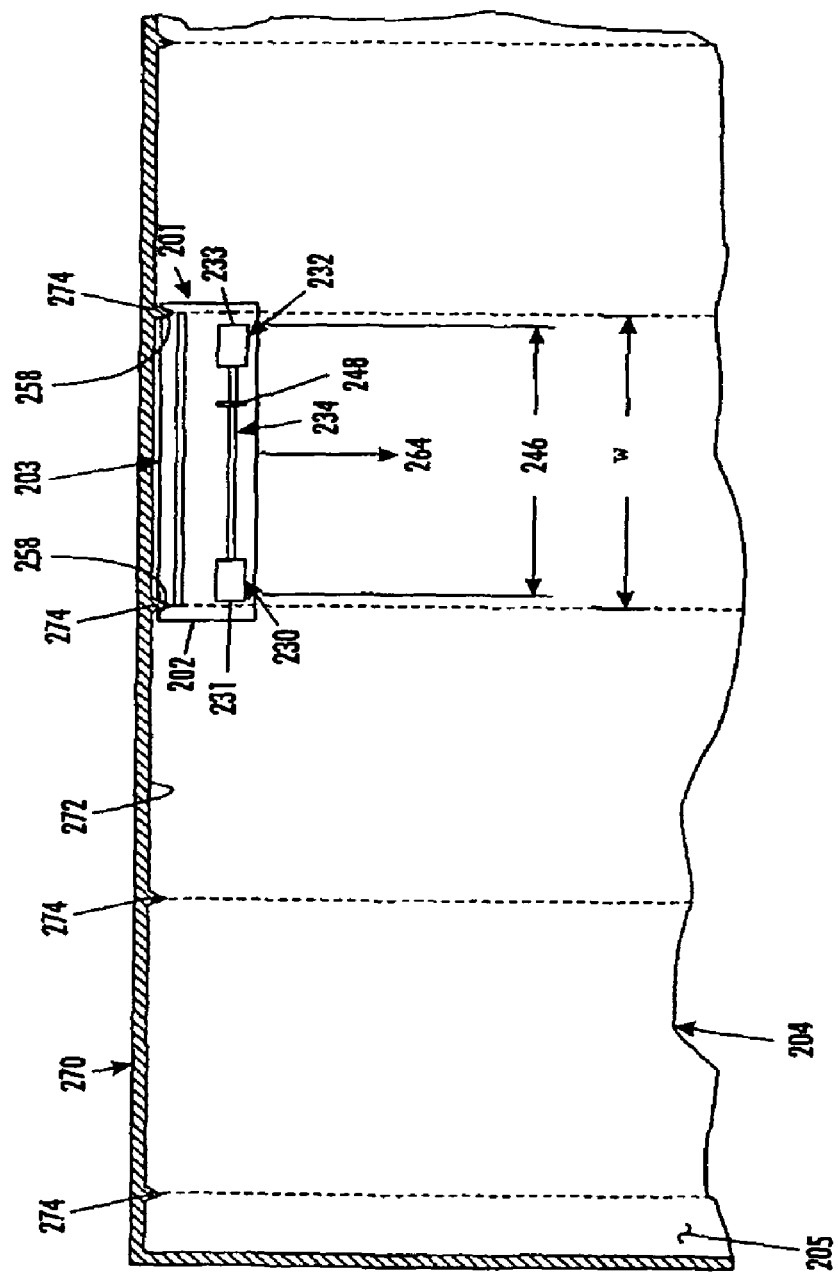
FIG. 9 is a diagrammatic top view of the printing tracks relative to the reference ruler according to the present exemplary embodiment; and, FIG. 10 is a diagrammatic view of a further embodiment of the printing system.

Referring now to FIGS. 7-9, according to the present application, a mountable reference marking system or reference ruler 250 is provided for aligning and indexing the position of a head portion or wand body 202 of a printer 201 relative to a printing surface 205 of a target object 204. The reference ruler 250 can include protuberant index points or marks 256 that can be matched with notches 258 on the wand body 202. The reference ruler 250 can be mounted along an edge 262 of the printing surface 205 of the target object 204. The reference ruler 250 can be made in one specific length out of, for example, plastic. Several lengths can be mechanically spliced together to achieve any desired length. The reference ruler 250 can be mounted in place, for example, above the target object 204 or clamped to the print surface 205. The user can match the notches 258 on the wand body 202 to each associated index point 256 in turn before guiding the wand or printer 201 down each print swath or track 264.

Alternatively, as illustrated in FIG. 8, a printable reference ruler 270 can be programmed into a wand printer driver to control a printing member or print head 203 which can print a reference ruler 270 including a top reference line 272 with short index marks 274 positioned at predetermined intervals which can be generally equal to the width w of the print area. The reference line 272 and index marks 274 can function as a preprint/prescan setup. The reference line 272 and index marks 274 provide an aligning and indexing reference to the user for facilitating placement of the printer/scanner wand 201 before printing successive print tracks 264 of an image or text over a large print area A. The user can match the notches 258 on the wand body 202 to each associated index point 274 in turn before guiding the wand or printer 201 down each print track 264

The reference ruler (270 of FIG. 8) can be printed on, or mounted (250 of FIG. 7) adjacent the target object 204, prior to the image tracks 264 being printed. To print reference ruler 270, the orientation of the wand body 202 can be rotated orthogonal to the subsequent print tracks 264. Utilizing the straight line tracking of the wand body 202, the reference ruler 270 can be printed in a straight line (axial direction) from a pre-print start position 275 to a pre-print finish position 276.

Figure 10:
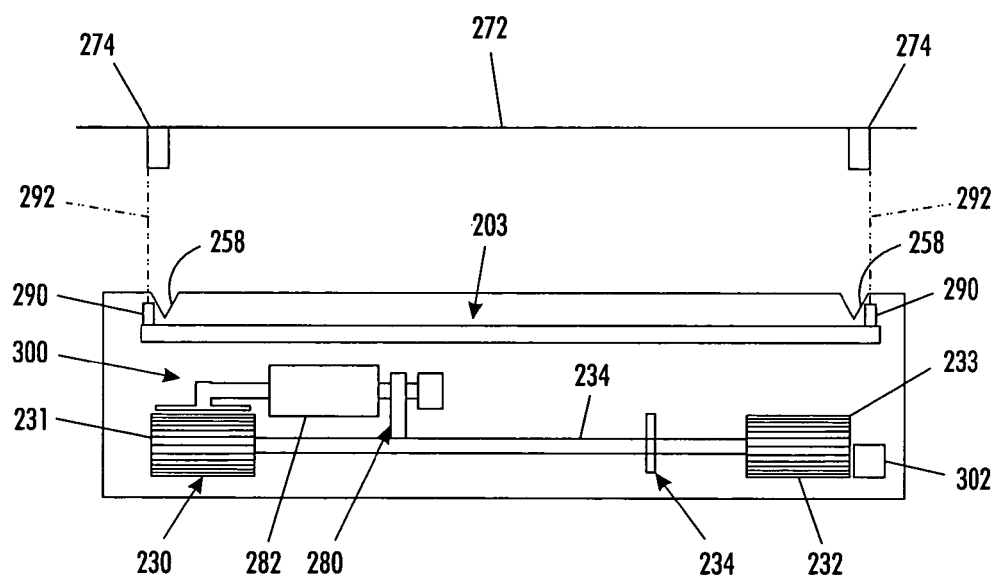

Referring now to FIG. 10, the straight line swiping can be further facilitated by a self-propelled wheel/axle assembly 280 including a manually energized drive or an electric motor 282. Manually energized drives can include, for example, inertia wheel, spring drive, compressed fluid drive, etc. The self-propelled assembly 280 can move the wand 201 orthogonal to the target object 204 and at a constant speed to minimize data manipulation for correct image printing and/or storage. Additionally, the straight line tracking assembly 236 and the wand body 202 can be coupled with a light source, such as fixed light emitting diodes ("LED(s)") 290 that project steering light beams 292 forward and/or rearward perpendicular to the wand body 252 for orthogonal guidance along an edge of the target object (not shown). In one example, the LED(s) 290 can be mounted adjacent the notches 258 of the wand body 202 such that the light beams 292 align, for example, rearward to the direction of travel, with the index points of the reference ruler (not shown). Maintaining alignment of the LED(s) 290 with the index points 256 assists in straight line tracking of the wand body 202. Furthermore, the wheels 230, 232 can be speed sensitive and controlled through the use of, for example, centrifugal clutch, viscous clutch/brake 300, electric motor/electric brake, etc. The speed control device would increase the resistance of the roller to roll freely, above a desired speed. The speed control device could also feed back to an indicator light 302, on the wand 201, to prompt the user if they were moving too rapidly or too slowly.

The method of printing an image on the target object 204 using the wand 201 having the moveable wand body 202 supporting the printing member 203 can comprise the following steps. Positioning the wand body 202 to place the printing member 203 in a start or pre-print orientation 275. Moving the wand body 202 in an axial direction to move the printing member 203 from the pre-print start position 275 to the pre-print finish position 270 whereby the reference ruler 270 is printed on the target object 204. Next, the wand body 202 is positioned to place the printing member 203 in a first printing position aligned with the reference ruler 270 by aligning the index marks 274 with the notches 258. The wand 201 is then moved along a first track direction or first printing track 264 to a plurality of successive printing positions each aligned and indexed along the reference ruler 270. Detecting the location of each successive one of the plurality of successive printing positions relative to the first printing position, wherein the step of detecting the location can comprise counting the plurality of successive printing positions. Determining what portion of the image is to be printed at the first printing position and at successive printing positions at each of the detected locations based on a predetermined scaling factor and the detected location. The printing member 203 can be activated in response to the determined portion of the image to be printed on the target object 204 at the first printing position and each of the detected locations so as to successively print all portions of the image on the target object.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A manual tracking system including a manually moveable wand for reading and writing media, comprising:
a wand tracking system including a first wheel and a second wheel rigidly coupled to an axle for manually guiding in a freeform motion said wand in a straight line direction;
a wand body partially enclosing said first wheel and said second wheel and said axle;
a printing member supported by said wand body for printing on a media surface, said printing member having a maximum print width for a predetermined position of said wand body relative to a target object, and wherein said target object having a width and said printing member print width substantially less than the entire width of said target object image to be printed;
said first wheel and said second wheel each include an outside edge disposed at opposing ends of said axle having a distance there between, said distance less than a width of said maximum print area;
said media surface is a media selected from the group consisting of whiteboard and glass;
said first wheel and said second wheel frictionally engage said media surface of said target object wherein said first wheel and said second wheel are in direct contact with said media surface including a coefficient of friction comprising a static resistance force when engaged with said target object;
said axle includes a yaw torque moment applied by a user when said wand is manually moved in said freeform motion across said target object;
said static resistance force of said first wheel and said second wheel is greater than said yaw torque moment;
wherein the area of the image is scanned in successive sections whereby the wand tracking system is manually moved and successively guided in a series of substantially straight line side-by-side adjacent tracks and then printed on said target object in a series of manually moved and successively guided substantially straight line side-by-side adjacent tracks;
a reference ruler is printed on said media surface by said wand, the wand is rotated orthogonal to said tracks, in a straight line direction for subsequent alignment of said wand body prior to printing the area of the image within said series of substantially straight line side-by-side adjacent tracks;
said reference ruler includes a series of index marks; and,
said wand includes an LED projected steering beam wherein said steering beam projects orthogonal to said wand body and aligns with said index marks to assist with indexing the position of said wand body on said media surface of said target object and for guiding said straight line tracks along said target object.

2. The manual tracking system of claim 1, wherein said first wheel and said second wheel comprises polyurethane rubber.

3. The manual tracking system of claim 2, wherein said first wheel and said second wheel further includes a hardness of about 80 A.

4. The manual tracking system of claim 1, wherein said first wheel and said second wheel each have a cylindrical shape.

5. The manual tracking system of claim 4, wherein said first wheel and said second wheel each include a speed sensitive brake.

6. The manual tracking system of claim 5, wherein said speed sensitive break is a speed regulator selected from the group consisting of centrifugal clutch, viscous clutch, and electric brake.

7. The manual tracking system of claim 6, wherein said brake further includes a feedback indicator light for prompting said user.

8. The manual tracking system of claim 7, wherein said straight line direction is orthogonal to said target object.

9. The manual tracking system of claim 1, wherein said printing member having a maximum print width for a predetermined position of said wand body,
said first wheel and said second wheel each having an outside edge defining a distance therebetween; and,
said distance less than said maximum print width.

10. The manual tracking apparatus of claim 1, wherein said first wheel and said second wheel have a static coefficient of friction of about 0.9.

11. The manual tracking apparatus of claim 1, wherein said first wheel and said second wheel have a kinetic coefficient of friction of about 0.8.

12. A manual tracking system including a manually moveable wand for reading and writing media, comprising:
a wand tracking system including a wand body having a first wheel and a second wheel coupled to an axle for manually guiding in a freeform motion said wand body in a straight line direction;
a printing member supported by said wand body for printing on a media surface, said printing member having a maximum print width for a predetermined position of said wand body relative to a target object substantially less than the entire width of an image to be printed whereby said image is read in at least two manually moved and successively guided side-by-side straight line tracks;
said target object is a media selected from the group consisting of whiteboard, glass, and digitally addressable surface;
said first wheel and said second wheel include a coefficient of friction comprising a static resistance force when engaged directly with said target object;
said axle includes a yaw torque moment applied by a user when said wand is manually moved in said freeform motion across said target object;
said static resistance force of said first wheel and said second wheel is greater than said yaw torque moment;
wherein the area of the image is printed on said target object in at least two manually moved and successively guided side-by-side straight line tracks;
a reference ruler is printed on said media surface by said wand, the wand is rotated orthogonal to said tracks, in a straight line direction for subsequent alignment of said wand body prior to printing the area of the image within said series of substantially straight line side-by-side adjacent tracks;
said reference ruler is printed orthogonal to said tracks.

13. A manual tracking system including a manually moveable wand for reading and writing media, comprising:
a wand tracking system including a wand body having a first wheel and a second wheel coupled to an axle for guiding said wand body in a manually moved straight line direction;
a printing member supported by said wand body for printing on a media surface, said printing member having a maximum print width for a predetermined position of said wand body relative to a target object substantially less than the entire width of an image to be printed, wherein an entire area of the image is printed on said target object in a series of manually moved and successively guided straight line tracks wherein each said track prints a portion of said entire area of the image;

said first wheel and said second wheel include a coefficient of friction comprising a static resistance force when engaged directly with said target object;

said axle includes a yaw torque moment applied by a user when said wand is manually moved in a freeform motion across said target object;

said static resistance force of said first wheel and said second wheel is greater than said yaw torque moment;

a reference ruler is printed on said media surface by said wand, the wand is rotated orthogonal to said tracks, in a straight line direction for subsequent alignment of said wand body prior to printing the area of the image within said series of substantially straight line side-by-side adjacent tracks; and said reference ruler is printed orthogonal to said tracks.

14. A manual tracking system including a manually moveable wand for reading and writing media, comprising:

a wand tracking system including a wand body having a first wheel and a second wheel coupled to an axle for guiding said wand body in a manually moved straight line direction;

a printing member supported by said wand body for printing on a media surface, said printing member having a maximum print area for a predetermined position of said wand body relative to a target object substantially less than the entire area of an image to be printed, wherein the area of the image is printed on said target object in a series of manually moved and successively guided straight line print tracks wherein each said track prints a portion of said entire area of the image in said successive adjacent side-by-side tracks;

a reference marking system for aligning and indexing the position of said wand body on said media surface of said target object;

said reference marking system includes a printable reference ruler having a reference line and index marks for alignment of said wand body prior to printing the area of the image within said successive adjacent side-by-side tracks;

said reference ruler is printed on said media surface by said wand, the wand is rotated orthogonal to said tracks, in a straight line direction wherein said reference ruler is printed orthogonal to said tracks;

said first wheel and said second wheel include a coefficient of friction comprising a static resistance force when engaged directly with said target object;

said axle includes a yaw torque moment applied by a user when said wand is manually moved in a freeform motion across said target object; and, said static resistance force of said first wheel and said second wheel is greater than said yaw torque moment.

15. The manual tracking system of claim 14, wherein said printable reference ruler is printed orthogonal to said print tracks.

16. The manual tracking apparatus of claim 14, wherein said target object is a media selected from the group consisting of whiteboard, glass, and digitally addressable surface.

* * * * *